United States Patent [19]
Katayama

[11] Patent Number: 5,999,368
[45] Date of Patent: Dec. 7, 1999

[54] MAGNETIC HEAD SLIDER PROVIDED WITH A HARD MATERIAL LAYER FOR IMPROVED IMPACT RESISTANCE AND FOR AVOIDING CRACKING OF AN AIR BEARING SURFACE DURING PRODUCTION OF THE MAGNETIC HEAD SLIDER

[75] Inventor: Masaki Katayama, Kawasaki, Japan

[73] Assignee: Fujitsu Limited, Kawasaki, Japan

[21] Appl. No.: 09/042,917

[22] Filed: Mar. 17, 1998

[30] Foreign Application Priority Data

Sep. 18, 1997 [JP] Japan ................................. 9-253674

[51] Int. Cl.⁶ ................................ G11B 5/60; G11B 5/58
[52] U.S. Cl. ............................................. 360/103; 360/109
[58] Field of Search ................................. 360/103, 122, 360/126, 109

[56] References Cited

U.S. PATENT DOCUMENTS

| | | | |
|---|---|---|---|
| 5,768,055 | 6/1998 | Tian et al. | 360/103 |
| 5,774,303 | 6/1998 | Teng et al. | 360/103 |
| 5,777,824 | 7/1998 | Gray | 360/103 |
| 5,841,608 | 11/1998 | Kasamatsu et al. | 360/103 |
| 5,864,452 | 1/1999 | Hirano et al. | 360/122 |

FOREIGN PATENT DOCUMENTS

| | | |
|---|---|---|
| 8235527 | 9/1996 | Japan . |
| 981924 | 3/1997 | Japan . |

*Primary Examiner*—Jefferson Evans
*Attorney, Agent, or Firm*—Greer Burns & Crain LTD

[57] ABSTRACT

In a method for producing a magnetic head slider 20, wherein, after a sacrificial layer 31 is formed on a substrate 30, a protective film layer 21, an adhesion layer 22, a head element layer 23 and an air bearing surface layer 28 are sequentially formed thereon, and finally a slider body 29 is formed by a plating, and then the magnetic head slider 20 is separated from the substrate 30 by the removal of the sacrificial layer 31. In order to prevent the air bearing surface layer from breaking or cracking due to the generation of bubbles during a process for removing the sacrificial layer by etching or the like and separating a magnetic head slider from a substrate, after the head element layer 23 has been formed but before the air bearing surface layer 28 is formed, a first hard film layer 24 consisting of a hard material is formed.

26 Claims, 8 Drawing Sheets

MAGNETIC HEAD SLIDER PROVIDED WITH A HARD MATERIAL LAYER FOR IMPROVED IMPACT RESISTANCE AND FOR AVOIDING CRACKING OF AN AIR BEARING SURFACE DURING PRODUCTION OF THE MAGNETIC HEAD SLIDER

BACKGROUND OF THE INVENTION

1. Field of the Invention

The present invention relates to a magnetic head slider used for a magnetic disk device or the like and a method for producing the same, more specifically to a magnetic head slider having an air bearing surface opposed to a recording medium and arranged generally in parallel to a head element layer, and a method for producing the same, wherein the magnetic head slider is formed on a substrate in such a manner that, after forming a sacrificial layer on a substrate, a protective film layer, an adhesion layer, a head element layer and an air bearing surface layer are sequentially formed thereon, and finally a slider body is formed by a plating; the magnetic head slider being separated from the substrate by the removal of the sacrificial layer.

2. Description of the Related Art

In recent years, it has been desired to further miniaturize a head element and a magnetic head slider in accordance with a recent demand for high density magnetic recording. To meet such a demand, a method for producing a miniaturized magnetic head slider which needs little machining and is easily assembled, has been required.

For the above reason, a method for producing a magnetic head slider which needs little machining has been proposed in the prior art (for example, in Japanese Unexamined Patent Publication (Kokai) No. 8-235527. "Thin Film Magnetic Head Slider and Method for Producing the Same").

The method disclosed in the specification of the above document is as follows:

A sacrificial layer is formed on a substrate by an Al film or the like, and a head element layer and an air bearing surface layer are sequentially formed. Then, a slider body is formed by means of a plating via a plating base, resulting in a magnetic head slider on the substrate. Next, the sacrificial layer is removed by means of an etching or the like to separate the magnetic head slider from the substrate. In this regard, if the sacrificial layer is made of Al, it is removable by an aqueous solution of KOH. Thereafter, the magnetic head slider is mounted to a suspension.

During the production of the magnetic head slider mainly by means of a film formation technology while excluding the machining process, as described above, bubbles (hydrogen $H_2$) are liable to be generated in a process for removing the sacrificial layer (such as Al film) by an etching (using an aqueous solution of KOH or the like) and thus separating the magnetic head slider from the substrate, due to the chemical reaction of the sacrificial layer with the etching liquid. Such bubbles push the periphery of the slider body upward to cause a force for forcibly releasing the air bearing surface layer (for example, made of $SiO_2$) which has not yet been separated from the substrate. If the air bearing surface layer is not durable to such a force, there might be a risk in that the air bearing surface layer breaks or cracks.

When the magnetic head slider comes into contact with or impinges on the recording medium while flying above the recording medium in the magnetic disc device, the slider receives an impact. If the slider is not durable to the impact, there might be a risk that the air bearing surface layer breaks or cracks, or the slider body (plated, for example, with nickel) might be dented and become inoperative.

SUMMARY OF THE INVENTION

Accordingly, an object of the present invention is to provide a magnetic head slider having such a high resistance to an impact on an air bearing surface layer and a slider body that the air bearing surface layer is not adversely effected but continues in normal operation even if the floating magnetic head slider comes into contact with or impinges on a recording medium in a magnetic disk device, and a method for producing the same.

Another object of the present invention is to provide a method for producing a magnetic head slider free from the generation of breakage or cracks due to the generation of bubbles during a process for separating a magnetic head slider from a substrate by removing a sacrificial layer by means of an etching or the like.

To achieve the above objects, according to the present invention, there is provided a method for producing a magnetic head slider having an air bearing surface opposed to a recording medium and arranged generally in parallel to a head element layer, said method comprising the steps of: forming a sacrificial layer on a substrate, and sequentially forming thereon a protective film layer, an adhesion layer and a head element layer; forming a first hard film layer consisting of a hard material on the head element; forming an air bearing surface layer on the first hard film layer; forming a slider body on the air bearing surface by plating; and separating the magnetic head slider, which comprises the protective film layer, the adhesion layer, the head element layer, the first hard film, the air bearing surface layer and the slider body, from the substrate by the removal of the sacrificial layer. Due to the hard film layer, the resistance to impact of the slider is improved and thus the air bearing surface layer is well protected when the same comes into contact with or impinges on a recording medium. Also, cracking or breakage of the air bearing surface layer due to the generation of bubbles during the process for separating the slider is avoidable.

Preferably, a second adhesion layer is formed after the first hard film layer has been formed but before the air bearing surface layer is formed. A third adhesion layer is preferably formed after the head element layer has been formed but before the first hard film layer has been formed.

After the adhesion layer has been formed but before the head element layer has been formed, a second hard film layer may be preferably formed of a hard material. More preferably, a fourth adhesion layer is formed after the second hard film layer has been formed but before the head element layer has been formed.

After the air bearing surface layer has been formed but before the slider body has been formed by a plating, a third hard film layer may be formed. More preferably, a fifth adhesion layer is formed after the third hard film layer has been formed, but before the slider body has been formed, by plating. Or after the air bearing surface layer has been formed but before the third hard film layer is formed, a sixth adhesion layer may be formed.

After the slider body has been formed by plating, a fourth hard film layer may be formed of a hard material. After the slider body has been formed by plating but before the fourth hard film layer has been formed, a seventh adhesion layer may be preferably formed. Or after the fourth hard film layer has been formed but before the slider body is coupled to a suspension, a eighth adhesion layer may be formed.

The hard film layer may be formed of NiP film, or the slider body may be formed of NiP film.

Also, the present invention provides a magnetic head slider wherein an air bearing surface layer opposed to a recording medium is formed generally in parallel to a head element layer, and from a side opposed to the recording medium to the other side of the slider, a protective film layer, an adhesion layer, the head element layer, the air bearing surface layer and a slider body are sequentially and closely laminated with each other, characterized in that a first hard film layer formed of a hard material is provided between the head element layer and the air bearing surface layer.

DETAILED DESCRIPTION OF THE EMBODIMENTS

Figure 3:
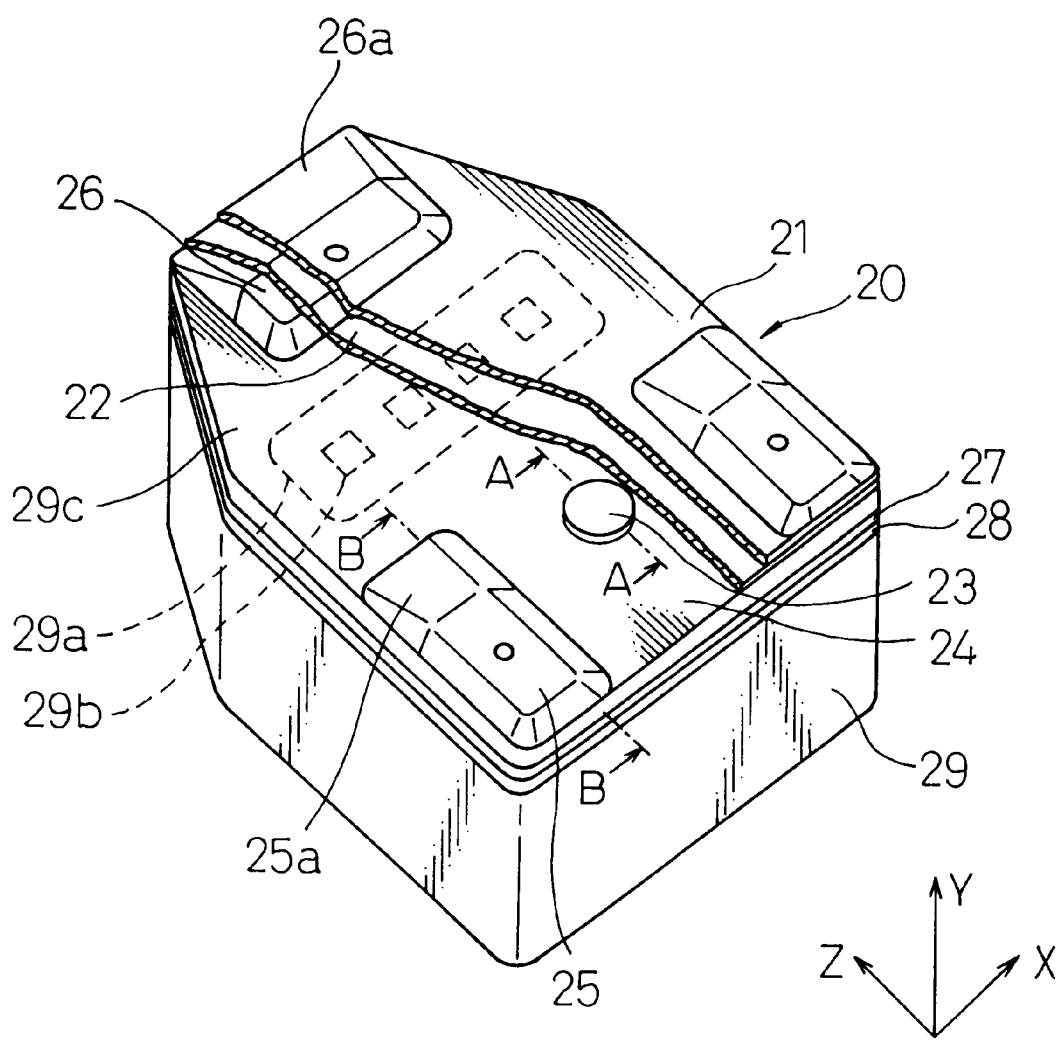
FIG. 3 is a perspective view of a magnetic head slider according to the present invention.

First, a magnetic head slider according to the present invention will be described with reference to FIG. 3 illustrating an appearance thereof. FIG. 3 is a partially broken perspective view wherein an air bearing surface is shown upside down and a recording medium (not shown) is present in an area in the direction Y when used. A moving direction of the recording medium is opposite to the direction Z. All over the air bearing surface of the magnetic head slider 20 opposed to the recording medium is coated a protective film layer 21 which is closely adhered to a head element layer 23 and a first hard film layer 24 via a first adhesion layer 22 located inside thereof.

A side of the first hard film layer 24 opposite to the upper side (nearer to the recording medium Y) is closely adhered to an air bearing surface layer 28 via a second adhesion layer 27. Further, a plating base (of a single layer or two layers) not shown is formed on a side of the air bearing surface layer 28 opposite to the upper side (nearer to the recording medium Y), on which base a slider body 29 is formed by plating.

A recess 29a is formed on a lower side of the slider body 29 as seen in FIG. 3, and a plurality of pad sections 29b defining terminals are arranged in the recess 29a. The number of pad sections 29b varies in accordance with the structure of the head element layer 23. For example, if a hybrid type magnetic head (in which a magnetoresistive head (MR head) used as a regeneration head and an inductive head used as a recording head are combined) is formed of the head element layer 23, there are two pairs of pad sections 29b wherein one pair is used for the MR head and the other is for the inductive head. In this regard, if reading and writing are carried out by a single magnetic head, the pad sections may be one pair.

Two side rails 25 for generating a floating force are arranged on the air bearing surface of the air bearing surface layer 28 in an air stream caused by the rotation of the recording medium, and a single center rail 26 for generating a floating force is arranged between the pair of side rails 25 at a position on the air entrance side. Portions of the respective rails 25, 26 on the air entrance side are formed as slopes 25a, 26a.

Figure 1:
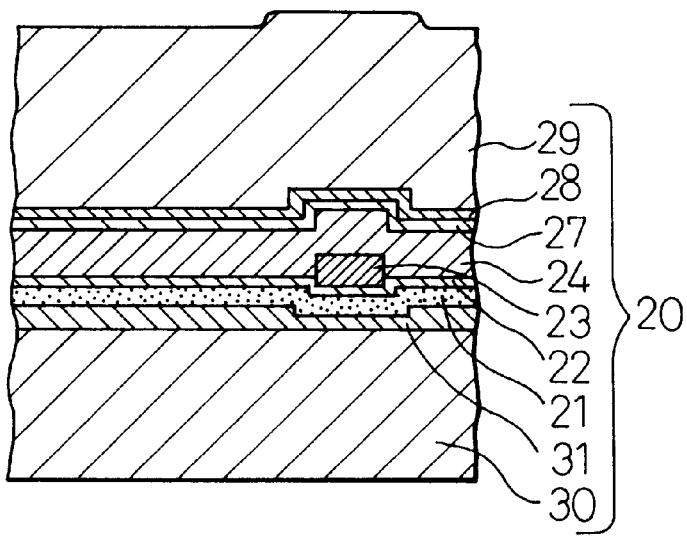
FIG. 1 is a side sectional view of a magnetic head slider according to a method of the present invention, taken along a plane A—A in FIG. 3, illustrating a state after a slider body has been formed by a plating.
Figure 2:
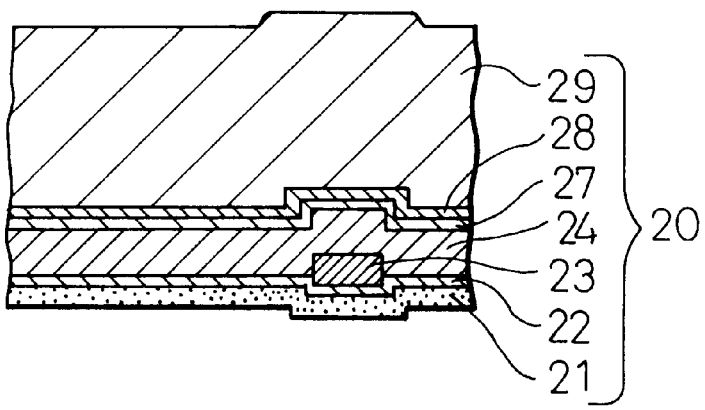
FIG. 2 is a side sectional view of a magnetic head slider according to a method of the present invention, taken along a plane A—A in FIG. 3 illustrating a state after a substrate has been removed.

Next, a method for producing the magnetic head slider 20 according to the present invention will be described with reference to a first aspect illustrated in FIGS. 1 and 2.

First, a sacrificial layer 31 is formed of Al (or Ti, Ta) on a substrate 30 made of Si, such as single crystal Si (having an orientation of, for example, 100). Due to a surface irregularity of the sacrificial layer 31, a contour of the side rail 25 and the center rail 26 and a projected height of the head element layer are determined. Since the slopes 25a, 26a are provided on the side rail 25 and the center rail 26 in the magnetic head slider 20 shown in FIG. 3, an area of the sacrificial layer 31 corresponding to the slope must have taper portions.

Figure 4A:
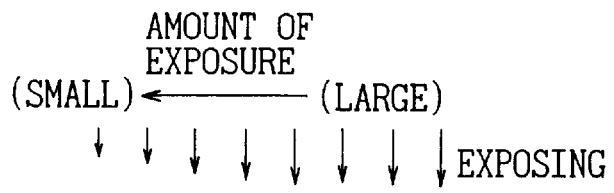
FIG. 4(a) to 4(f) illustrate a sequence for producing a magnetic head slider according to the present invention, respectively, taken along a plane B—B in FIG. 3.
Figure 4B:
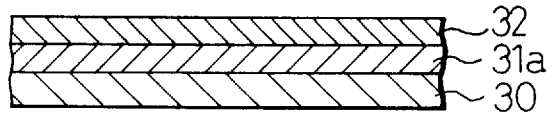
Figure 4C:
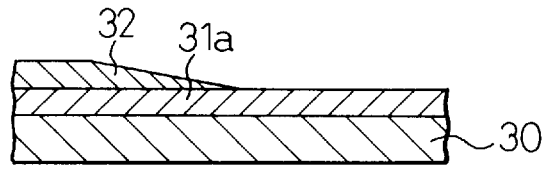
Figure 4D:
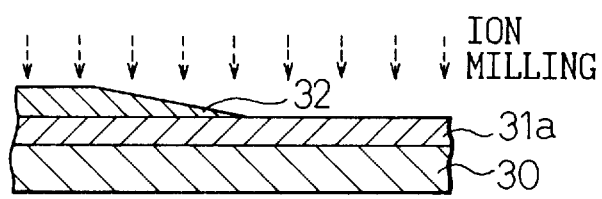
Figure 4E:
Figure 4F:
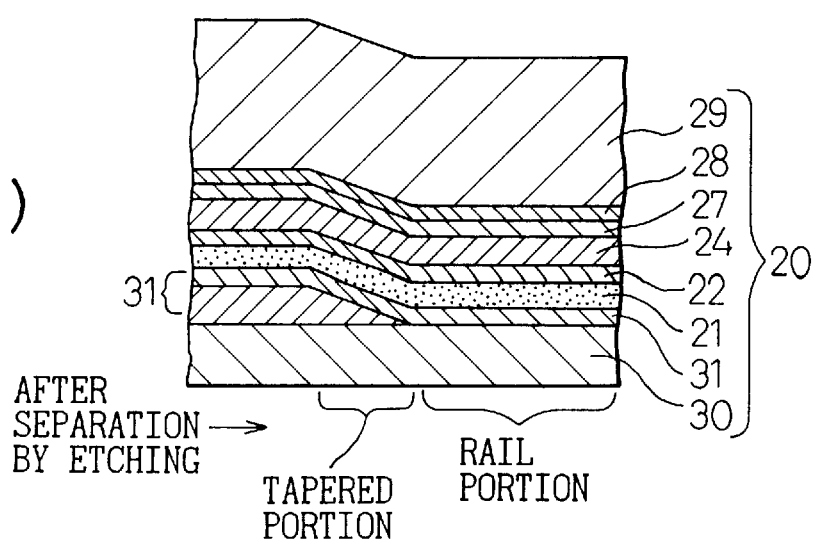

A method for forming the taper portion is illustrated in FIGS. 4(a) to 4(f). According to this method, after a sacrificial layer 31a has been formed on the substrate 30, a photoresist 32 is coated and exposed. During the exposure, an amount of exposure is gradually changed in the taper portion in accordance with the inclination, as shown in FIG. 4(a). After forming the taper portion by the development of the photoresist 32, as shown in FIG. 4(b), the sacrificial layer 31a is etched by means of an ion milling, a sputter etching or the like, as shown in FIG. 4(c). Then the photoresist 32 is removed to result in a pattern of the sacrificial layer 31a with the taper portion, as shown in FIG. 4(d). Thereafter, a second sacrificial layer 31b is formed all over the surface to result in a structure corresponding to the sacrificial layer 31 shown in FIG. 1 (FIG. 4(e)).

After the irregularity corresponding to that of the upper surface (on a side nearer to the air bearing surface) of the magnetic head slider 20 has been formed on the sacrificial layer 31 in such a manner, a protective film layer 21 of carbon (having a thickness of approximately 10 nm) is formed on the sacrificial layer 31 by means of sputtering, plasma CVD or the like, and a first adhesion layer 22 of SiC or the like (having a thickness of approximately several nm) is formed by means of a sputtering or the like.

The reason for forming the first adhesion layer 22 is that otherwise the adhesion of the protective film layer 21 becomes inferior during a series of film forming processes, and an excessive force is applied to the inferior adhesion part to generate cracks or breakage, which lowers the yield.

Thereafter, a head element layer 23 consisting of a plurality of layers is formed and a first hard film layer 24 is formed by a plating. This hard film layer 24 may be formed of Ni film having a thickness in a range from several to ten μm. Then, a second adhesion layer 27 is formed by a vapor deposition. The second adhesion layer 27 may be formed of Ti film having a thickness of approximately 10 nm.

Next, an air bearing surface layer 28 is formed with $SiO_2$, carbon (diamond-like carbon), $Al_2O_3$ or the like.

On the air bearing surface layer 28, there is a plating base made of Ti and/or NiFe. After forming a plating mask (not shown) with a photoresist, a slider body 29 (having a thickness in a range from several tens to one hundred and several tens of $\mu$m) and pad sections 29b thereof (FIG. 1) are formed by a plating (FIG. 4(f)). After the plating, the photoresist and the plating base are removed from a portion on which no plated film is adhered.

In the above structure components, the magnetic head slider 20 of the present invention is structured as a laminate from the protective film layer 21 to the slider body 29.

In this regard, an NiP film plated on a surface of an Al medium in a magnetic disk device has a function, due to its high hardness, of protecting the Al medium from caving-in.

Next, the operation of the first embodiment according to the present invention will be described below.

The magnetic head slider 20 (from the protective film layer 21 to the slider body 29) is separated from the substrate 30 by dissolving the sacrificial layer 31 by a chemical etching. An example of the etching liquid is an aqueous solution of KOH. During this etching, bubbles ($H_2$) are generated. These bubbles push the periphery of the magnetic head slider 20 upward from the substrate 30 to generate a force which forcibly releases the air bearing surface layer 28 (of $SiO_2$ or the like) and the substrate 30 from the protective film layer 21 which has not been yet separated. In this case, since the NiP-plating film constituting the first hard film layer 24 is hard to be durable against this releasing force, a laminate from the protective film layer 21 to the air bearing surface layer 28 is protected so as to not be broken, resulting in an improvement in production yield.

Also, since the NiP-plating film constituting the first hard film layer 24 has a hardness durable against an impact generated when the magnetic head slider 20 comes into contact with or impinges on the recording medium, a laminate from the protective film layer 21 to the air bearing surface layer 28 is protected even though such contact or collision occurs. Also, since the plated slider body 29 (of Ni or the like) is not damaged in such a case, an inconvenience is avoidable. For example, change in floating amount or floating posture of the magnetic head slider 20 due to the deformation thereof is avoided.

Further, since the second adhesion layer 27 of Ti is provided for the purpose of facilitating the adhesion between the first hard film layer 24 and the air bearing surface layer 28, there is an advantage in that cracking and separation of films are avoidable during the film formation process.

Another embodiment of the present invention will be described below with reference to FIG. 5.

Figure 5:
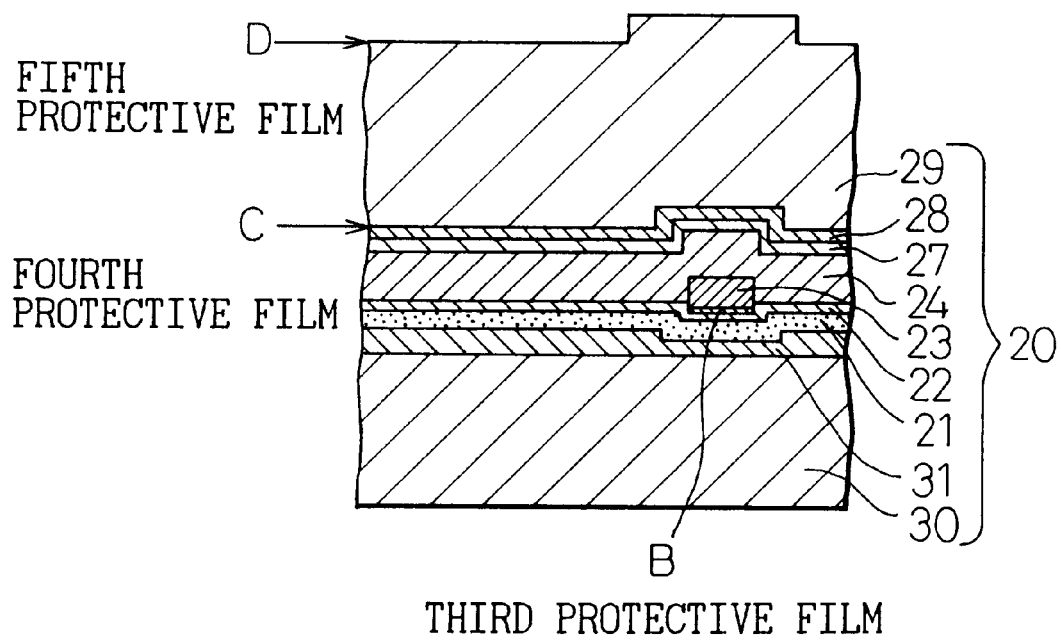
FIG. 5 is an illustrating of another aspect of the present invention corresponding to FIG. 1.

While the first hard film layer 24 of NiP is plated after the head element layer 23 has been formed but before the second adhesion layer 27 is formed in the above-mentioned first aspect, such hard film layers of NiP may be provided at positions B, C and D in FIG. 5, respectively, in addition to the first hard film layer 24. If the hard film layer is provided at the position B or C (i.e., between the first adhesion layer 22 and the head element layer 23 or between the air bearing surface layer 28 and the slider body 29), there is an advantage in that the protection of the magnetic head slider 20 is facilitated against the breakage occurring due to bubbles or collision with the recording medium. At the position D (i.e., between the magnetic head slider and the suspension (not shown) thereof), there is an advantage in that even if a force is applied to the slider 20 when the magnetic head slider 20 is bonded to the suspension, the plated slider body 29 is not damaged or deformed because the NiP film is sufficiently hard.

While the second adhesion layer 27 is provided between the hard film layer 24 and the air bearing surface layer 28 in the above-mentioned first aspect, it may be formed after or before the formation of B, C or D for the purpose of enhancing the adhesion of the first hard film layer 24 to the other layer.

A position at which the hard film layer of a hard material and an adhesion layer are formed may be optionally selected other than described above.

While the slider body 29 of the magnetic head slider is formed of Ni-plating film, there are cases wherein it can be replaced with NiP-plating film so that the hard film layer and the slider body 29 can be integrally formed, resulting in the elimination of a production process.

Figure 6:
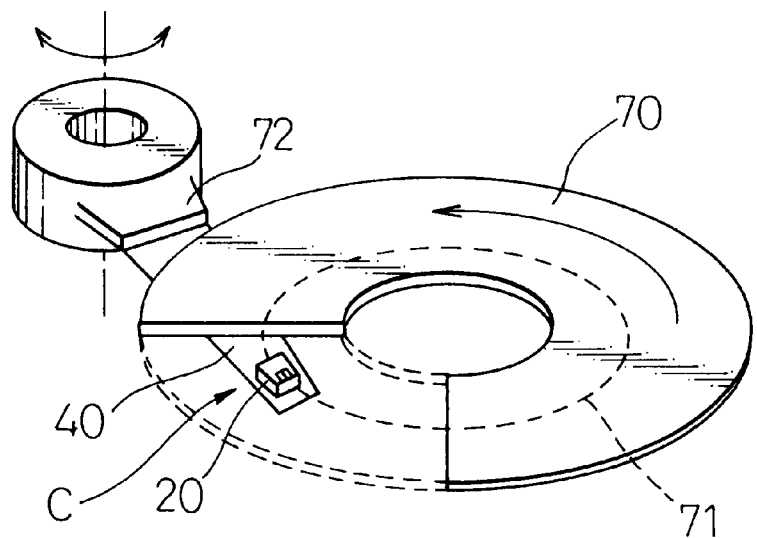
FIG. 6 is a perspective view of part of a magnetic disk device.
Figure 7:
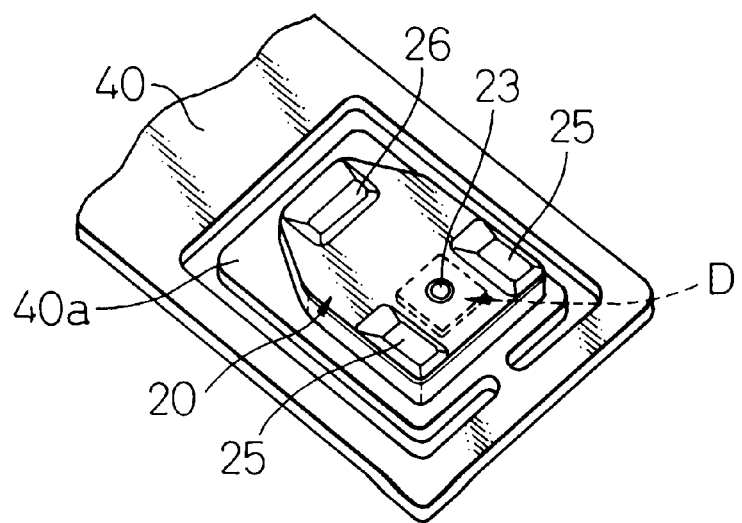
FIG. 7 illustrates a mounting of a magnetic head slider.

As shown in FIG. 6, in the magnetic disk device, a head arm 72 is driven to intersect a track 71 of a recording medium 70. A suspension 40 carrying a magnetic head slider is provided at a front end of the head arm 72. FIG. 7 is a perspective view of the magnetic head slider 20 described above mounted to the suspension, which is an enlarged view of area C in FIG. 6, wherein the magnetic head slider 20 is fixed to a slider support 40a provided on the suspension 40.

To facilitate the fixation of the magnetic head slider 20, a metallic film of Au is preferably formed on a surface of the pad sections 29b and the periphery of the slider body 29 (see FIG. 3) for bonding the same with the suspension 40. In this case, a conductor pattern is formed on a surface of the suspension 40 opposed to the slider body. According to such a structure, it is possible to easily fix both with each other by a hot contact bonding or an ultrasonic contact bonding or with an electroconductive adhesive. By the above fixation, the pad sections 29b and the conductor pattern of the suspension 40 are electrically and mechanically coupled to each other, and the periphery 29c of the slider body 20 is mechanically coupled to the suspension 40.

Figure 8:
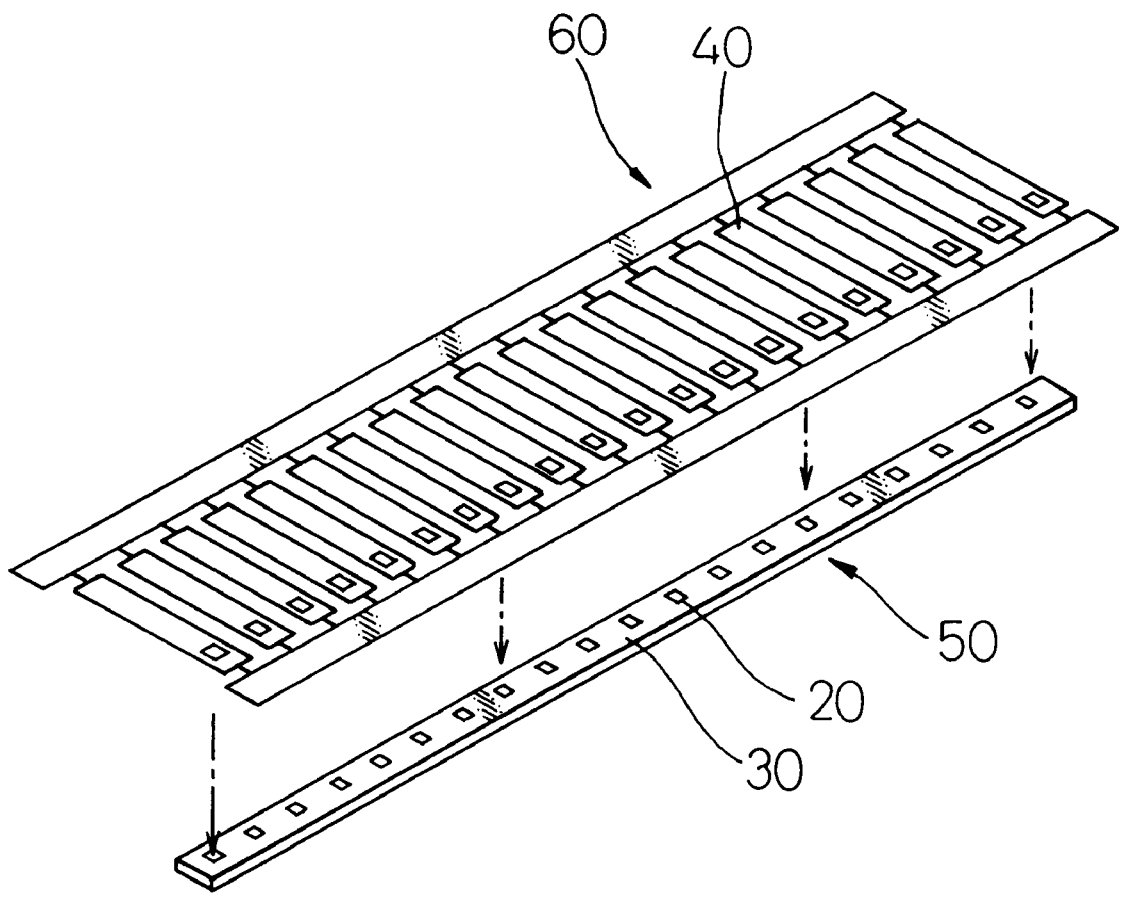
FIG. 8 illustrates a bonding of a plurality of magnetic head sliders with a plurality of suspensions.

In the actual production of the magnetic head slider 20, a number of magnetic head sliders 20 are two-dimensionally arranged on a single substrate 30. To bond a number of magnetic head sliders 20 to a number of suspensions 40 at once, a method shown in FIG. 8 is employed in this aspect. According to this method, a substrate 30 carrying a number of magnetic head sliders 20 in a two-dimensional arrangement is divided into slider blocks 50 in which a plurality of magnetic head sliders 20 are linearly arranged. On the other hand, a rectangular suspension plate 60 consisting of the suspensions 40 arranged at the same pitch as that of the magnetic head sliders 20 is preliminarily prepared by etching or the like. The respective suspensions 40 in the suspension plate 60 are superposed with the respective magnetic head sliders 20 in the slider block 50, and both are bonded with each other at once.

After the bonding of the respective suspensions 40 in the suspension plate 60 and the respective magnetic head sliders 20 in the slider block 50 have been completed, the sacrificial layer 31 is removed by an etching. Thereby, the slider block 50 is separated from the substrate 30, and the magnetic head slider 20 is as shown in FIG. 2. After being separated from the substrate 30, the suspension plate 60 is cut into individual suspensions 40. Thus, a number of magnetic head sliders 20 having a suspension 40 are obtained.

Figure 9:
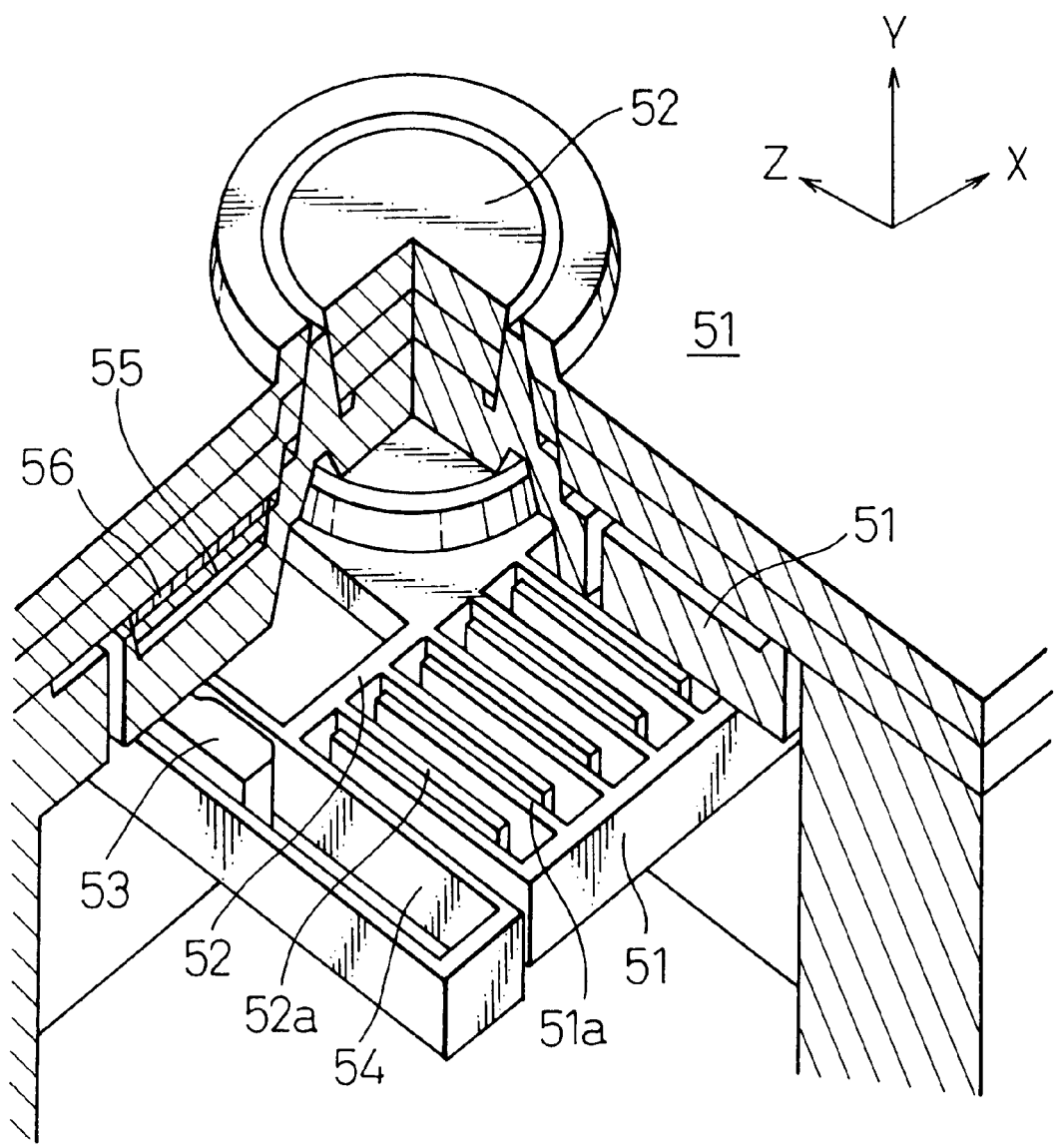
FIG. 9 is a partially broken perspective view of an electrostatic actuator capable of being built into a magnetic head slider according to the present invention.

FIG. 9 shows an electrostatic actuator section built-in the interior of the magnetic head slider in a sectional view, which is an enlarged view of an area D in FIG. 7. In FIG. 9, reference numeral 51 denotes a stationary section; 52 a movable section in which a head element 23 is provided; 53 a pillar; 54 a support spring for supporting the movable section 52; 55 an insulating layer; 56 an electrode; 51a a tooth on the stationary side; and 52a a tooth on the movable side.

The movable section 52 in which the head element 23 is provided is arranged between the two rails 25 and 15 supported by the support spring 54 to be movable in the direction X (tracking direction) transverse to the media moving direction (reverse to Z) relative to the stationary section 51 as well as to be movable upward/downward in the direction Y (loading/unloading direction). The stationary section 51 and the movable section 52 have a plurality of parallel teeth 51a, 52a arranged so that the tooth 52a in the movable section is disposed at a position which deviates from a center of the adjacent two teeth 51a in the stationary section 51. When a voltage is applied between both (the movable section 52 is grounded), the movable section 52 is moved relative to the stationary section 51 in the direction X to a position at which the electrostatic attraction force and an elastic force of the support spring 54 are balanced.

When a voltage is applied upon the electrode 56 provided in the stationary section opposed to a flat portion of the movable section, the movable section 52 is moved by a minute distance also in the direction Y against an elastic force of the support spring 54 due to an electrostatic attraction force applied on the movable section 52. Thus, the supporting spring 54 supports the movable section 52 also in the direction Y.

Figure 10:
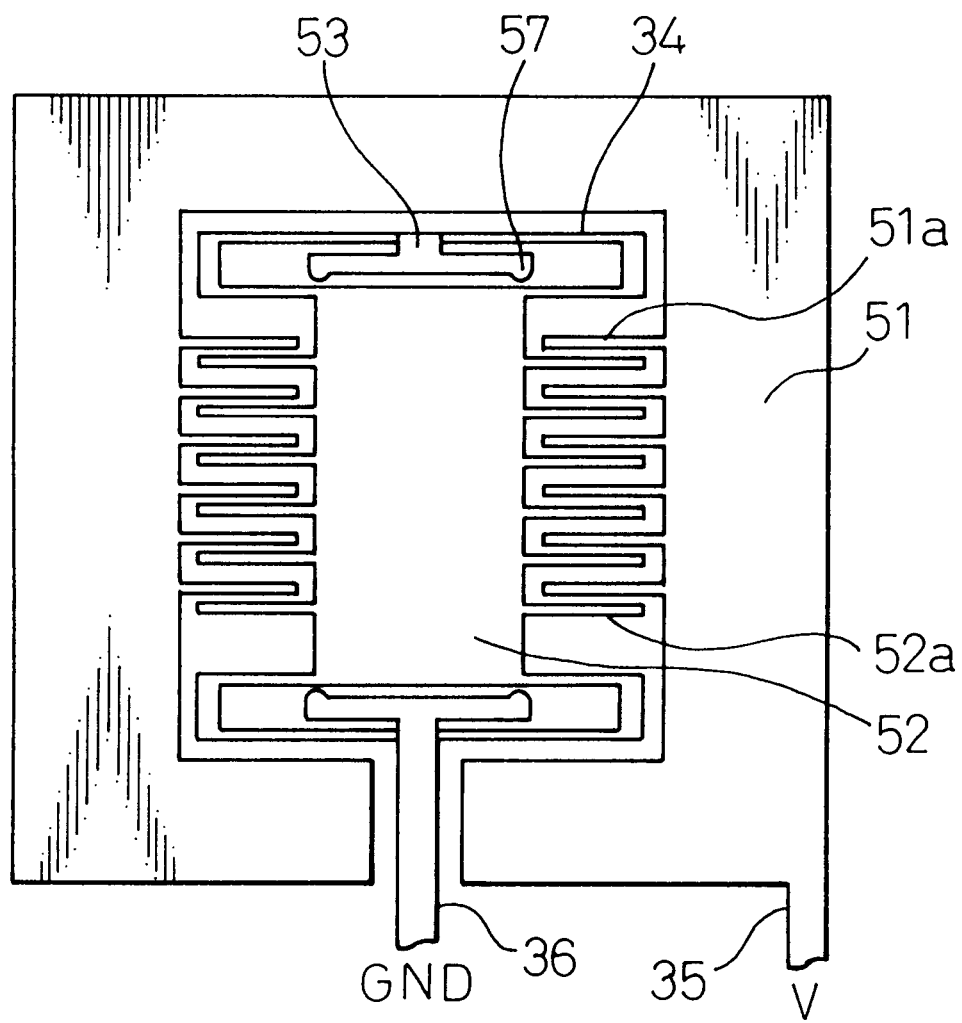
FIG. 10 is a plan view of the electrostatic actuator shown in FIG. 9.

FIG. 10 is a plan view of the electrostatic actuator section shown in FIG. 8. An outer frame is a body of the stationary section 51 formed by a plating and fixed to a substrate not shown. The parallel teeth 51a are provided toward the inner circumference at a pitch simultaneously with the body of the stationary section 51 in the inner wall thereof by a nickel plating. These teeth 51a may be fixed to the substrate or may be provided at a gap (not shown) therefrom. A central portion located inside the frame of the stationary section 51 is a body of the movable section 52 formed simultaneously with the body of the stationary section 51 at a gap (not shown) from the substrate by a nickel plating to be movable relative to the stationary section 51. A plurality of teeth 52a are provided in the body of the movable section 52 at positions deviated from centers of every adjacent teeth 51a in the stationary section 51 in parallel thereto. In the drawing, pillars 53 fixed to the substrate are formed at positions above and beneath the movable section 52. Between the pillar 53 and the body of the movable section 52, a support spring 54 is provided so that the movable section 52 is movable solely upward and downward as seen in the drawing. Conductor wires 35, 36 formed by a nickel plating for the connection to terminals (not shown) extend from a lower right portion of the stationary section 51 and the lower pillar.

When a voltage is applied between the two conductor wires 35, 36, the movable section 52 is attracted upward due to an electrostatic attraction force acting between the teeth 51a in the stationary section 51 and the teeth 52a in the movable section 52, and is moved to a position at which the electrostatic attraction force and an elastic force of the support spring 54 are balanced. Since the attraction force is proportional to a square of a potential difference, the movable section is moved in the same direction irrespective of polarity. However, to prevent the adverse effects of driving noise from being imparted to an object to be driven (i.e., a head element 32) mounted to the movable section 52, it is better to ground the movable section 52.

To prevent a short-circuit from occurring, which may be caused by contact of the teeth 51a in the stationary section 51 with the teeth 52a in the movable section 52 when an excessively high voltage is input, a stopper 57 is provided in the pillar 53 so that a gap from the movable section 52 becomes smaller. Since the stopper 57, that is, the pillar 53 has the same potential as that of the movable section 52 (grounded), there is no problem even if the stopper comes into contact with the movable section 52.

As described above, according to the present invention, the magnetic head slider is protected from an impact or a force generated from the collision or contact to the recording medium during the operation or in the production process, due to a hardness of the first hard film layer in the magnetic head slider, whereby the production yield is improved and an abnormal operation is eliminated.

It should be understood by those skilled in the art that the foregoing description relates to some preferred embodiments of the disclosed invention, and that various changes and modifications may be made to the invention without departing from the spirit and scope thereof.

I claim:

1. A method for producing a magnetic head slider having an air bearing surface opposed to a recording medium and arranged generally in parallel with a head element layer, said method comprising the steps of:

forming a sacrificial layer on a substrate, and sequentially forming thereon a protective film layer, an adhesion layer and a head element layer;

forming a first hard film layer consisting of a hard material on the head element;

forming an air bearing surface layer on the first hard film layer;

forming a slider body on the air bearing surface by a plating; and separating the magnetic head slider, which comprises the protective film layer, the adhesion layer, the head element layer, the first hard film, the air bearing surface layer and the slider body, from the substrate by the removal of the sacrificial layer.

2. A method as defined by claim 1, wherein a second adhesion layer is formed after the first hard film layer has been formed but before the air bearing surface layer is formed.

3. A method as defined by claim 1, wherein a third adhesion layer is formed after the first hard film layer has been formed but before the head element layer is formed.

4. A method as defined by claim 1, wherein a second hard film layer of a hard material is formed after the adhesion layer has been formed but before the head element layer is formed.

5. A method as defined by claim 4, wherein a fourth adhesion layer is formed after the second hard film layer has been formed but before the head element layer is formed.

6. A method as defined by claim 1, wherein a third hard film layer is formed after the air bearing surface layer has been formed but before the slider body is formed by a plating.

7. A method as defined by claim 6, wherein a fifth adhesion layer is formed after the third hard film layer has been formed but before the slider body is formed by a plating.

8. A method as defined by claim 6, wherein a sixth adhesion layer is formed after the air bearing surface layer has been formed but before the third hard film layer is formed.

9. A method as defined by claim 1, wherein a fourth hard film layer of a hard material is formed after the slider body has been formed by a plating.

10. A method as defined by claim 9, wherein a seventh adhesion layer is formed after the slider body has been formed by a plating but before the fourth hard film layer is formed.

11. A method as defined by claim 9, wherein an eighth adhesion layer is formed after the fourth hard film layer has been formed but before the slider body is coupled to a suspension.

12. A method as defined by claim 1, wherein a NiP film is used as the hard film layer.

13. A method as defined by claim 1, wherein the slider body is plated with a NiP film.

14. A magnetic head slider wherein an air bearing surface layer opposed to a recording medium is formed generally in parallel to a head element layer, and from a side opposed to the recording medium to the other side of the slider, a protective film layer, an adhesion layer, the head element layer, the air bearing surface layer and a slider body are sequentially and closely laminated with each other, wherein a first hard film layer formed of a hard material is provided between the head element layer and the air bearing surface layer to improve impact resistance of the slider and avoid cracking of the air bearing surface layer due to the generation of bubbles during a process of separating the slider from a substrate.

15. A head slider as defined by claim 14, wherein a second adhesion layer is provided between the first hard film layer and the air bearing surface layer.

16. A head slider as defined by claim 14, wherein a third adhesion layer is provided between the first hard film layer and the head element layer.

17. A head slider as defined by claim 14, wherein a second hard film layer of a hard material is provided between the adhesion layer and the head element layer.

18. A head slider as defined by claim 17, wherein a fourth adhesion layer is provided between the second hard film layer and the head element layer.

19. A head slider as defined by claim 14, wherein a third hard film layer of a hard material is provided between the air bearing surface layer and the slider body.

20. A head slider as defined by claim 19, wherein a fifth adhesion layer is provided between the third hard film layer and the slider body.

21. A head slider as defined by claim 19, wherein a sixth adhesion layer is provided between the third hard film layer and the air bearing surface.

22. A head slider as defined by claim 14, wherein a fourth hard film layer of a hard material is formed on the upper surface of the air bearing surface layer.

23. A head slider as defined by claim 22, wherein a seventh adhesion layer is provided between the fourth hard film layer and the slider body.

24. A head slider as defined by claim 22, wherein an eighth adhesion layer is formed on the upper surface of the fourth hard film layer.

25. A head slider as defined by claim 14, wherein a NiP film is used as a hard film layer.

26. A head slider as defined by claim 14, wherein the slider body is formed of a NiP film.

* * * * *